United States Patent
Diamantoglou et al.

(10) Patent No.: US 9,920,151 B2
(45) Date of Patent: Mar. 20, 2018

(54) HIGHLY SWELLABLE POLYMERS

(71) Applicant: BASF SE, Ludwigshafen (DE)

(72) Inventors: Michael Diamantoglou, Erlenbach (DE); Christoph Hartmann, Elsenfeld (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 14/354,356

(22) PCT Filed: Oct. 26, 2012

(86) PCT No.: PCT/EP2012/071269
§ 371 (c)(1),
(2) Date: Apr. 25, 2014

(87) PCT Pub. No.: WO2013/060848
PCT Pub. Date: May 2, 2013

(65) Prior Publication Data
US 2014/0294515 A1  Oct. 2, 2014

(30) Foreign Application Priority Data
Oct. 28, 2011 (DE) .................. 10 2011 117 127

(51) Int. Cl.
| | | |
|---|---|---|
| *C08F 251/02* | (2006.01) | |
| *C08F 20/00* | (2006.01) | |
| *C09K 17/18* | (2006.01) | |
| *B01J 20/26* | (2006.01) | |
| *C05G 3/00* | (2006.01) | |
| *C05G 3/04* | (2006.01) | |
| *A01G 9/02* | (2018.01) | |
| *A01G 31/00* | (2018.01) | |

(52) U.S. Cl.
CPC .......... *C08F 251/02* (2013.01); *B01J 20/267* (2013.01); *C05G 3/0047* (2013.01); *C05G 3/04* (2013.01); *C08F 20/00* (2013.01); *C09K 17/18* (2013.01); *A01G 9/021* (2013.01); *A01G 2031/007* (2013.01); *B01J 2220/4825* (2013.01); *B01J 2220/4875* (2013.01); *B01J 2220/68* (2013.01)

(58) Field of Classification Search
CPC ........ C08F 251/02; C08F 20/00; C09K 17/18; C05G 3/0047; C05G 3/04; A01G 9/021; A01G 2031/007; B01J 2220/68; B01J 2220/4825; B01J 2220/4875
See application file for complete search history.

(56) References Cited

U.S. PATENT DOCUMENTS

| | | |
|---|---|---|
| 2004/0234760 A1 | 11/2004 | Hamed |
| 2009/0163365 A1 | 6/2009 | Bentlage et al. |
| 2010/0275664 A1 | 11/2010 | Windghoevel |
| 2011/0136986 A1 | 6/2011 | Elliott et al. |
| 2014/0158626 A1* | 6/2014 | Ziemer ................ A61L 15/425 210/660 |

FOREIGN PATENT DOCUMENTS

| | | |
|---|---|---|
| CN | 101519476 | 9/2009 |
| DE | 3831261 | 3/1990 |
| DE | 10 2005 021 221 | 11/2006 |
| DE | 20 2007 016 362 | 4/2009 |
| DE | 10 2007 056 264 | 7/2009 |
| DE | 10 2010 047 379 | 4/2012 |
| WO | WO 2004/018005 | 3/2004 |
| WO | WO 2004/018006 | 3/2004 |
| WO | WO 2006/119828 | 11/2006 |
| WO | WO 2010/018143 | 2/2010 |

OTHER PUBLICATIONS

Rompp Chemielexikon, "Cellulose" 10th edition, Georg Thieme Verlag Stuttgart/New York, 1996 to 1999.*
English translation of the International Search Report dated Jan. 23, 2013, prepared in International Application No. PCT/EP2012/071269.
English translation of the International Preliminary Report on Patentability dated Aug. 27, 2013, prepared in International Application No. PCT/EP2012/071269.
Dizhbite, T. et al., "Characterization of the radical scavenging activity of lignins-natural antioxidants", Bioresour. Technol. 2004, p. 309-317, vol. 95, issue 3.

* cited by examiner

*Primary Examiner* — Jennifer A Smith
(74) *Attorney, Agent, or Firm* — Brinks Gilson & Lione

(57) ABSTRACT

The present invention relates to a method for producing polymers that are suitable for absorbing and storing aqueous liquids, and to polymers that can be obtained by this method. This invention further related to the use of such polymers. The method comprises the following steps:
i. crosslinking free-radical polymerization of a monomer composition M comprising
   a) at least one monomer A having an ethylenic double bond and at least one neutralizable acid group or a group hydrolyzable to a neutralizable acid group,
   b) optionally one or more comonomers B which are different than the monomers A and have one ethylenic double bond, and
   c) 0.05 to 10% by weight, based on the total amount of monomers A and B, of at least one crosslinker C,
   in the presence of at least one polysaccharide-comprising substance S, in an aqueous liquid, where the weight ratio of the monomer composition M to the substance S is in the range from 9:1 to 1:9; and
ii. at least partial neutralization of the acid groups and/or hydrolysis of the groups hydrolyzable to neutralizable acid groups in the polymer obtained in step i.;
wherein the polymerization and/or the neutralization is performed in the presence of urea.

11 Claims, No Drawings

HIGHLY SWELLABLE POLYMERS

This application is a National Stage application of International Application No. PCT/EP2012/071269, filed Oct. 26, 2012, the entire contents of which is hereby incorporated herein by reference. This application also claims priority under 35 U.S.C. § 119 to German Patent Application No. 10 2011 117 127.8, filed Oct. 28, 2011, the entire contents of which is hereby incorporated herein by reference.

The present invention relates to a process for preparing polymers suitable for absorbing and storing aqueous liquids, and to the polymers obtainable by this process. The invention also relates to the use of these polymers.

Polymers suitable for absorbing and storing several times their own weight of aqueous liquids are known. For such polymers, names such as "superabsorbent", "high-swellability polymer", "hydrogel" (often also used for the dry form), "hydrogel-forming polymer", "water-absorbing polymer", "absorbent gel-forming material", "swellable resin", "water-absorbing resin", "water-absorbing polymer" or the like are commonly used. These polymers are crosslinked hydrophilic polymers, more particularly polymers formed from (co)polymerized hydrophilic monomers, graft (co)polymers of one or more hydrophilic monomers on a suitable graft base, crosslinked cellulose ethers or starch ethers, crosslinked carboxymethylcellulose, partly crosslinked polyalkylene oxide or natural products swellable in aqueous liquids, for example guar derivatives, the most common being polymers based on partly neutralized acrylic acid. The essential properties of such polymers are their abilities to absorb several times their own weight of aqueous liquids and not to release the liquid again even under a certain pressure. High-swellability polymers of this kind, which are typically used in the form of a dry powder, are converted to a gel when they absorb fluid, and correspondingly to a hydrogel when they absorb water as usual. Crosslinking is essential for synthetic high-swellability polymers and is an important difference from customary straightforward thickeners, since it leads to the insolubility of the polymers in water.

Fredric L. Buchholz and Andrew T. Graham (editors), in: "Modern Superabsorbent Polymer Technology", J. Wiley & Sons, New York, U.S.A./Wiley-VCH, Weinheim, Germany, 1997, ISBN 0-471-19411-5, give a comprehensive review of high-swellability polymers, the properties thereof and processes for producing high-swellability polymers.

High-swellability polymers of a wide variety of different types have now developed to become an economically very important group of products, and there are enormous global production capacities. As well as the current principal use in the hygiene sector, other fields of use are also gaining significance, for example as soil amendments in agriculture and in horticulture, or as fire extinguishants, to mention just a few.

There are various proposals of urea as an additive for high-swellability polymers.

DE 38 31 261 A1 teaches the preparation of high-swellability polymers by free-radical polymerization of at least partly neutralized acrylic acid in the presence of crosslinkers, the degree of neutralization being increased by adding a nitrogen-containing, thermally decomposable compound, for example urea, during the superabsorbent production before the drying operation as a blowing agent, in order to obtain a loose resin of good grindability.

WO 2004/018 005 A1 and WO 2004/018 006 A1 mention urea as a possible surface postcrosslinking agent for high-swellability polymers based on crosslinked polyacrylates.

WO 2010/018143 teaches the use of salts of urea in the preparation of high-swellability polymers by free-radical polymerization of at least partly neutralized acrylic acid in the presence of crosslinkers to reduce the residual monomer content.

US 2004/0234760 A1 describes the production of water-swellable cellulose fibers, in which conventional cellulose fibers are impregnated with an aqueous solution of a carboxyl-containing monomer and a crosslinker, and then the monomers are polymerized fully to give a water-swellable polymer.

WO 2006/119 828 A1 teaches a hybrid material formed from high-swellability polymers based on crosslinked polyacrylates and inorganic solid particles, which is suitable as a plant substrate. The production is effected by free-radical polymerization of at least partly neutralized acrylic acid in the presence of crosslinkers. It is possible here to add particular organic additives, including urea or polysaccharides, to the hybrid material during or after the polymerization.

DE 102007056264 describes a material for improving soil quality, especially for increasing water absorption capacity and water storage capacity of soils, that comprises a water-swellable polymer as the matrix and inorganic solid particles distributed in the matrix, the polymer having carbohydrate-based structural units. The material is produced by free-radical polymerization of a mixture of at least partly neutralized acrylic acid, crosslinkers, inorganic particles and carbohydrates. Optionally, urea is added during the polymerization.

One disadvantage of the high-swellability polymers based on acrylic acid known from the prior art is in many cases the very poor or even absent biodegradability and compostability, which is of significance especially when the high-swellability polymers are to be used for improving soil quality, especially for improving the absorption and storage of water in soils.

The industrial plants for production of the high-swellability polymers known from the prior art are often very costly and entail extensive investment in apparatus, control technology, energy supply, whether for heating or cooling, stirring etc. The space required for such plants is usually also very large. High costs also arise in many cases for the inward transport of the starting materials.

There is thus still a need here for improved products and for processes which work better and more advantageously and which lead to high-swellability polymers which have a good and improved profile of properties, and which allow the processing of many substances, more particularly of often worthless waste products, and hence also enable disposal problems at source, and even then are still environmentally friendly and additionally offer better utility and new applications.

DE 102010047379 describes compostable water-absorbing and water-storing polymers based on acrylic acid, which comprise waste materials based on polysaccharides, especially based on ligneous cellulose materials, and which have good biodegradability and good compostability. The polymers are prepared by free-radical polymerization of an aqueous mixture of acrylic acid, crosslinker, waste material and water under acidic conditions, followed by a neutralization of the reaction product.

It is therefore an object of the invention to provide high-swellability polymers which can absorb and store aqueous liquids such as water, solutions, emulsions and liquid dispersions, and are simultaneously compostable and can therefore be used to improve soil quality. More particularly, the high-swellability polymers are to have maximum water absorption capacity and are to be very substantially or fully degraded in the soil. It is also a further object of the invention to provide a process for producing such products, which is simple and economically viable to perform, which does not require any great apparatus complexity, which is environmentally friendly, and in which it is possible to use cheap waste products and by-products which often cannot be reutilized without great cost and inconvenience, and which reliably leads to good and versatile products.

These and further objects are achieved by the process described in the claims and hereinafter, and by the high-swellability polymers obtainable thereby.

Accordingly, the invention relates to a process for preparing polymers suitable for absorbing and storing aqueous liquids, which comprises the following steps:

i. crosslinking free-radical polymerization of a monomer composition M comprising
  a) at least one monomer A having an ethylenic double bond and at least one neutralizable acid group or a group hydrolyzable to a neutralizable acid group,
  b) optionally one or more comonomers B which are different than the monomers A and have one ethylenic double bond, and
  c) 0.05 to 10% by weight, based on the total amount of monomers A and B, of at least one crosslinker C,
  in the presence of at least one polysaccharide-comprising substance S, in an aqueous liquid, where the weight ratio of the monomer composition M to the substance S is in the range from 9:1 to 1:9; and
ii. at least partial neutralization of the acid groups and/or hydrolysis of the groups hydrolyzable to neutralizable acid groups in the polymer obtained in step i.;

wherein the polymerization and/or the neutralization is performed in the presence of urea.

The process according to the invention affords, in a reliable and easily performable manner, high-swellability polymers, i.e. polymers which can absorb and store several times their own weight of aqueous liquids. In addition, the materials are readily compostable and are substantially or fully degraded in the soil.

The process according to the invention does not require any complex apparatus and can also be performed with ingress of atmospheric oxygen. The process according to the invention works very inexpensively and reliably and allows the reproducible production of superabsorbents with an advantageous profile of properties. A particularly great advantage is that the apparatus complexity is very low, since there is no need to remove heat or to work under protective gas atmosphere. Stirring of the reaction mixture during the polymerization is likewise not required. The polymerization proceeds in an extremely controlled manner. In principle, performance of the process requires merely a heatable reaction vessel with a lid. The process according to the invention can therefore also be performed within small companies having simple equipment.

A further advantage is that the product, when dried, for example in a paddle drier, is obtained directly as a free-flowing product.

A particularly advantageous possibility is that of using waste materials and by-products obtained in the processing of polysaccharide-containing materials. These can be processed without any problems directly at the location and site where they are obtained. This dispenses with disposal of the waste materials and by-products; the polymers obtained in accordance with the invention are very environmentally friendly.

When used as soil improvers, the polymers break down over the course of time, but continue to work for such a period that they can fulfill their task, for example as a water sponge, for a couple of years. This is also true when they are used filled with fertilizers or crop protection compositions and the like. In this respect, they are also very suitable for the controlled release of water and active ingredients.

The invention also provides the polymers obtainable by the process according to the invention.

In the first step of the process according to the invention, a crosslinking free-radical polymerization of a monomer composition M is performed in the presence of at least one cellulose-comprising substance S.

The monomer composition M comprises one or more monomers A having a polymerizable ethylenic double bond and at least one neutralizable acid group or at least one group hydrolyzable to a neutralizable acid group.

The acid group of the monomers A may, for example, be a carboxyl, sulfo or phosphonic acid group. Hydrolyzable groups are particularly nitrile groups, carboxamide groups and carboxylic anhydride groups.

In general, the monomers A are water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Preferred monomers A have at least one neutralizable acid group, especially one or two neutralizable acid groups. Preferably, the at least one neutralizable acid group of the monomers A is one or two carboxyl groups. Particularly preferred monomers A have one carboxyl group and one ethylenic double bond.

Suitable monomers A are especially
  monoethylenically unsaturated monocarboxylic acids having 3 to 8 carbon atoms, hereinafter monoethylenically unsaturated $C_3$-$C_8$-monocarboxylic acids, for example acrylic acid, methacrylic acid and ethacrylic acid, and mixtures thereof;
  monoethylenically unsaturated dicarboxylic acids having 4 to 8 carbon atoms, hereinafter monoethylenically unsaturated $C_4$-$C_8$-dicarboxylic acids, such as maleic acid, fumaric acid and itaconic acid, and mixtures thereof;
  anhydrides monoethylenically unsaturated dicarboxylic acids having 4 to 8 carbon atoms, hereinafter anhydrides monoethylenically unsaturated $C_4$-$C_8$-dicarboxylic acids, such as maleic anhydride;
  monoethylenically unsaturated sulfonic acids, such as styrenesulfonic acid and 2-acrylamido-2-methylpropanesulfonic acid (AMPS);
  monoethylenically unsaturated mononitriles having 3 to 8 carbon atoms, such as acrylonitrile and methacrylonitrile;
  monoethylenically unsaturated phosphonic acids, such as vinylphosphonic acid.

Preferred monomers A are selected from monoethylenically unsaturated $C_3$-$C_8$-monocarboxylic acids, especially from acrylic acid and methacrylic acid, mixtures thereof and mixtures of at least one monoethylenically unsaturated $C_3$-$C_8$-monocarboxylic acid such as acrylic acid or methacrylic acid with one or more monoethylenically unsaturated $C_4$-$C_8$-dicarboxylic acids such as itaconic acid.

More particularly, the monomers A are selected from monoethylenically unsaturated $C_3$-$C_8$-monocarboxylic acids, especially from acrylic acid and methacrylic acid.

The proportion of acrylic acid in the total amount of monomers A is especially at least 50 mol %, more preferably at least 90 mol %, most preferably at least 95 mol %.

As well as the monomers A, the monomer composition may comprise monoethylenically unsaturated monomers which are different than the monomers A and are copolymerizable with the monomers A (comonomers B).

In general, the monomers A are water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable comonomers B are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate and diethylaminoethyl methacrylate.

The comonomers B account for generally not more than 49.95% by weight, particularly not more than 19.9% by weight and especially not more than 9.8% by weight, based on the total weight of the monomer composition, i.e. based on the total amount of monomer A+comonomer B+crosslinker C. Accordingly, the proportion of monomers A is generally at least 50% by weight, particularly at least 80% by weight and especially at least 90% by weight, based on the total weight of the monomer composition, i.e. based on the total amount of monomer A+comonomer B+crosslinker C. In a specific embodiment, the monomer composition does not comprise any comonomer B or comprises less than 1% by weight of comonomers B, based on the total weight of the monomer composition, i.e. based on the total amount of monomer A+comonomer B+crosslinker C.

As well as the monomers A and any comonomer B present, the monomer composition comprises 0.05 to 10% by weight or 0.1 to 10% by weight, frequently 0.05 to 1.5% by weight or 0.1 to 1.5% by weight, particularly 0.1 to 1% by weight and especially 0.2 to 0.8% by weight, based on the total amount of monomer A and any comonomer B present, of one or more crosslinkers C.

The crosslinkers used may in principle be all substances comprising either at least two ethylenically unsaturated groups or at least one ethylenic double bond and at least one functional group which reacts with acid groups or at least two functional groups which react with acid groups. The reaction of the functionality may include formation of a covalent bond or of a coordinate bond.

Crosslinkers C are preferably compounds having at least two polymerizable groups which can be polymerized free-radically into the polymer network. Suitable crosslinkers C are, for example, ethylene glycol dimethacrylate, diethylene glycol diacrylate, polyethylene glycol diacrylate, allyl methacrylate, trimethylolpropane triacrylate, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, methylenebisacrylamide, methylenebismethacrylamide, or crosslinker mixtures as described, for example, in DE 195 43 368 A1, DE 196 46 484 A1, WO 90/15830 A1 and WO 2002/32962 A2. In addition, it is possible to use crosslinkers including diallylacrylamide, triallyl citrate, allyl ethers of di- and polyols and ethoxylates thereof, and allyl ethers of amines and salts thereof, these having at least two ethylenic double bonds, for example triallylamine and tetraallylammonium chloride.

Preferred crosslinkers C are pentaerythrityl triallyl ether, tetraallyloxyethane, methylenebisacrylamide, methylenebismethacrylamide, 10 to 20-tuply ethoxylated trimethylolpropane triacrylate, 10 to 20-tuply ethoxylated trimethylolethane triacrylate, more preferably 15-tuply ethoxylated trimethylolpropane triacrylate, polyethylene glycol diacrylates having 4 to 30 ethylene oxide units in the polyethylene glycol chain, trimethylolpropane triacrylate, di- and triacrylates of 3 to 30-tuply ethoxylated glycerol, more preferably di- and triacrylates of 10-20-tuply ethoxylated glycerol, and triallylamine. The polyols incompletely esterified with acrylic acid may also be present here as Michael adducts with one another, as a result of which it is also possible for tetraacrylates, pentaacrylates or even higher acrylates to be present. In a particularly preferred embodiment of the present invention, the crosslinker C used is methylenebisacrylamide.

As well as the monomer A, any comonomer B present and the crosslinker C, the monomer composition typically comprises no or not more than 1% by weight of ethylenically unsaturated compounds other than the monomer A, any comonomer B present and the crosslinker C. In other words: the monomer A, any comonomer B present and the crosslinker C form the polymer in the polymerization.

According to the invention, the monomer composition is polymerized in the presence of at least one polysaccharide-comprising substance S.

The polysaccharide-comprising substance S is typically used in such an amount that the weight ratio of substance S to the monomer composition M, i.e. to the total amount of monomer A+any comonomer B present+crosslinker C, is in the range from 1:9 to 9:1, preferably in the range from 2:8 to 8:2, particularly in the range from 7:3 to 3:7. In this way, a balanced ratio of water absorption capacity and compostability/biodegradability in the soil is achieved. It is assumed that, under the polymerization conditions, particularly efficient grafting of the polymer formed from the monomers A, any comonomers B used and the crosslinker C onto the polysaccharide chains of the polysaccharide-containing substance S is achieved.

The polysaccharide-containing substance S used may be polysaccharides, polysaccharide-containing substances and polysaccharide derivatives from a wide variety of different provenances. These include pure natural substances and natural substance derivatives such as cellulose, carboxymethyl cellulose, hydroxyethyl cellulose, cellulose ethers, starch, starch ethers, guar, chitin, chitosan, sodium alginate etc.

Preferred substances S are water-insoluble, i.e. the water solubility is below 1 g per liter at 20° C.

Preference is given to using the substance S in the form of a finely divided particulate material. "Finely divided" is understood to mean that the particles of the material have particle dimensions below 500 µm, particularly below 300 µm and especially below 200 µm. More particularly, at least 90% by weight of the particles have dimensions below 500 µm, more preferably below 300 µm and most preferably below 200 µm, for example in the range from 1 to <500 µm, particularly in the range from 5 to <300 µm and especially in the range from 10 to <200 µm, determined by sieve analysis.

Preferred substances S comprise cellulose or cellulose derivatives and are also referred to hereinafter as cellulose materials. Preference is given especially to cellulose materials which comprise bound lignin and which are also referred to as lignocellulose materials. These include particularly materials of vegetable origin, such as finely divided materials based on wood parts and plant parts, and industrial waste materials comprising cellulose and lignin, for example reject materials from pulp production, and mixtures thereof with lignin-free or low-lignin cellulose materials, the proportion of ligneous materials accounting for preferably at least 50% by weight, especially at least 60% by weight, based on the total mass of the substance S. In particularly preferred embodiments of the invention, the ligneous materials account for at least 90% by weight, based on the total mass of the substance S.

In particularly preferred embodiments, the ligneous cellulose materials are vegetable or industrial waste materials or by-products obtained in the processing and treatment of vegetable materials, or mixtures thereof with lignin-free or low-lignin cellulose materials, in which case the proportion of waste materials or by-products accounts for preferably at least 50% by weight and particularly at least 60% by weight, based on the total mass of the substance S. In very particularly preferred embodiments of the invention, the waste materials or by-products account for at least 90% by weight, based on the total mass of the substance S.

Examples of such vegetable or industrial waste materials or by-products obtained in the processing and treatment of vegetable materials are, without any restriction thereto, hemp dust, flax dust, sawdust, ground straw, ground olive stones, ground tree bark, reject material from pulp production, sugar beet peel, sugar cane waste, rice husks, cereal husks, ground hemp fibers, ground flax fibers, ground Chinese silvergrass fibers, ground coconut fibers, ground kenaf fibers and ground wood fibers, the vegetable or industrial waste materials or by-products particularly being in the form of a finely divided material having the above-specified particle sizes. Examples of low-lignin or lignin-free cellulose products are pure cellulose or crude cellulose.

In particularly preferred embodiments of the invention, the substance S is a reject material from pulp production.

In likewise particularly preferred embodiments of the invention, the substance S is hemp dust or flax dust, or a mixture thereof with pure cellulose or raw cellulose, in which case the proportion of hemp dust or flax dust accounts for preferably at least 50% by weight, particularly at least 60% by weight or at least 90% by weight, based on the total mass of the substance S.

According to the invention, the polymerization of the monomer composition is performed in an aqueous liquid. The aqueous liquids include, as well as water, also solvent-water mixtures which may generally comprise up to 20% by weight, based on the aqueous liquid, of organic water-miscible solvents, e.g. alcohols such as methanol or ethanol. Preferably, the aqueous liquid is water, which especially comprises less than 5% organic solvents.

By using the aqueous liquid, it is possible to impart an initial viscosity advantageous for the performance of the reactions to the system, i.e. to the reaction mixture, which ensures the consistency of a slurry. Typically, the initial viscosity (determined to DIN EN 2555-2000 by means of a Brookfield viscometer at 23° C. at a shear gradient of <10 sec$^{-1}$) is in the range from 10 to 1000 mPa·s, especially 20 to 300 mPa·s. Typically, the reaction mixture is dilatant, i.e. has a higher viscosity at a low shear rate of <10 sec$^{-1}$ and a lower viscosity at a higher shear rate (>100 sec$^{-1}$).

The slurry consistency of the reaction mixture prior to the polymerization can be established in a simple manner via the amount of the feedstocks and of the aqueous liquid. Preferably, the total amount of substance S and monomer composition is 5 to 50% by weight and particularly 10 to 30% by weight, based on the total amount of the reaction mixture, i.e. based on the total amount of substance S, monomer composition and aqueous liquid. Preferably, the amount of substance S is 3 to 30% by weight and particularly 5 to 25% by weight, based on the total amount of the reaction mixture, i.e. based on the total amount of substance S, monomer composition and aqueous liquid.

According to the invention, the polymerization is performed by free-radical means. Processes for this purpose are basically known to those skilled in the art. In connection with the present invention, reference is made to the disclosures in DE 36 13 207 A1 and U.S. Pat. No. 7,607,259 B2, here more particularly to column 2 lines 14 to 63.

In general, a polymerization initiator will be added to the reaction mixture for this purpose and the reaction mixture will optionally be heated to the polymerization temperature. The polymerization initiators used may be all compounds which generate free radicals under the polymerization conditions, for example thermal initiators, redox initiators or photoinitiators. Preference is given to thermal initiators, especially to those having a peroxide group, and to redox initiators. Suitable thermal initiators are especially the salts of peroxodisulfuric acid, such as sodium peroxodisulfate, potassium peroxodisulfate and ammonium peroxodisulfate. Suitable redox initiators are particularly peroxides in combination with one or more reducing agents. Examples of peroxides are hydrogen peroxide and the aforementioned salts of peroxodisulfuric acid. Examples of reducing agents are ascorbic acid, sodium bisulfite, salts of 2-hydroxy-2-sulfinatoacetic acid and salts of 2-hydroxy-2-sulfonatoacetic acid, especially the sodium salts, and mixtures of the reducing agents. Examples of redox initiator systems are sodium peroxodisulfate/ascorbic acid, hydrogen peroxide/ascorbic acid, sodium peroxodisulfate/sodium bisulfite and hydrogen peroxide/sodium bisulfite. In one embodiment of the invention, mixtures of thermal initiators and redox initiators are used, such as sodium peroxodisulfate/hydrogen peroxide/ascorbic acid. The reducing component used is preferably a mixture of the sodium salt of 2-hydroxy-2-sulfinatoacetic acid, the disodium salt of 2-hydroxy-2-sulfonatoacetic acid and sodium bisulfite (in the form of Brüggolit® FF6M or Brüggolit® FF7, or alternatively BRUGGOLITE® FF6M or BRUGGOLITE® FF7, available from L. Brüggemann KG, Salzstrasse 131, 74076 Heilbronn, Germany, www.brueggemann.com). In another embodiment, the initiator is a thermal initiator, preferably a salt of peroxodisulfuric acid, such as sodium peroxodisulfate.

The polymerization can be performed in the presence of a hydroquinone monoether as a chain transfer agent/modulator. The reaction mixture comprises preferably at most 250 ppm by weight, more preferably at most 130 ppm by weight, especially preferably at most 70 ppm by weight, of hydroquinone monoether, based in each case on monomer A. If desired, the content in the monomer composition of hydroquinone monoether is frequently at least 10 ppm by weight, particularly at least 30 ppm by weight and especially about 50 ppm by weight, based on the amount of the monomers A. For example, the monomer composition can be prepared by using an ethylenically unsaturated monomer A with an appropriate content of hydroquinone monoether. Preferred hydroquinone monoethers are hydroquinone monomethyl ether (MEHQ) and/or alpha-tocopherol (vitamin E).

For polymerization, the constituents of the reaction mixture, i.e. the monomer composition, the substance S and the aqueous liquid, and optionally, if desired, urea will be combined and the polymerization initiator will be added to the mixture. If required, the mixture will then be heated to the polymerization temperature. It is also possible first to heat the mixture of monomer composition, substance S and aqueous liquid to the desired reaction temperature and to add the polymerization initiator thereto. The sequence of addition of monomer composition, substance S and aqueous liquid, and of any urea, is of minor significance.

The temperature required for polymerization naturally depends on the initiator used and is typically in the range from 20 to 100° C., frequently in the range from 60 to 100° C. and especially in the range from 70 to 90° C.

Because of the presence of the acidic monomers A, the mixture of monomer composition, substance S and aqueous liquid typically has an acidic pH. In general, the polymerization is therefore effected at a pH<6, frequently at a pH of not more than 5 or more particularly at a pH of not more than 4 or not more than 3.5. More particularly, the polymerization is effected at a pH in the range from 1 to 4, especially at a pH in the range from 1 to 3.5.

The polymerization can be performed as a batchwise process. For this purpose, the constituents of the reaction mixture will typically be mixed in a suitable polymerization vessel, preferably choosing the amount of aqueous liquid such that the mixture has a slurry consistency. The polymerization initiator is then added to this mixture and optionally heated to the necessary polymerization temperature. In this context, it has been found to be advantageous that there is no need to stir the polymerization mixture comprising the initiator. Instead, the polymerization proceeds homogeneously and to completion without any need for inconvenient mixing of the polymerization mixture during the polymerization.

The polymerization can also be performed continuously. For this purpose, a mixture of the constituents of the reaction mixture will typically be fed into a reaction zone at polymerization temperature and the initiator fed into this reaction zone. The amount of aqueous liquid in the mixture of the constituents of the reaction mixture is preferably chosen such that the mixture has a slurry consistency. The reaction zone is preferably equipped with apparatuses for mixing the constituents. In a preferred configuration of the continuous polymerization, the polymerization is performed in a heatable reaction vessel equipped with a rotating screw, for example a heatable screw extruder.

For performance of the polymerization, exclusion of oxygen is not required. In other words, the polymerization can be performed in the presence of atmospheric oxygen, i.e. under air. However, the polymerization can also be performed with substantial exclusion of oxygen, for example under inert gas.

According to the invention, the polymerization and/or the neutralization is performed in the presence of urea. The urea may already be present during the polymerization or be added after the polymerization, preferably before or during the hydrolysis.

It has been found to be favorable when the urea is already present during the neutralization. In this way, the workup, specifically the neutralization/hydrolysis, is found to be easier. More particularly, the presence of urea reduces disadvantages as occur in the course of neutralization/hydrolysis of the aqueous, generally acidic polymerization mixture, for example the occurrence of semisolid, rubberlike phases that are difficult to comminute, or facilitates the breakup and comminution of such phases.

More particularly, the procedure is to treat the polymer obtained in step i. with urea before or during the neutralization in step ii. Preferably, the polymerization is not performed in the presence of urea.

Preference is given to using the urea in the form of a solution, particularly of an aqueous solution, particularly of a concentrated solution, especially of a concentrated aqueous solution, for example with a concentration in the range from 30 to 70% by weight, especially 40 to 60% by weight, for example about 50% by weight.

The amount of urea is generally selected such that the total amount of urea is in the range from 1 to 20% by weight, frequently in the range from 3 to 15% by weight and especially in the range from 5 to 10% by weight, based on the reaction mixture, i.e. based on the total amount of monomer composition, aqueous liquid, or based on the total mass of the polymerization product obtained in step i), before removal of any amounts of liquid. Based on the total amount of monomer composition and substance S, the amount of urea is preferably in the range from 5 to 60% by weight, particularly 10 to 50% by weight and especially 15 to 45% by weight.

According to the invention, in step ii., the polymer obtained in step i. is subjected to a neutralization or a hydrolysis, with at least partial neutralization or hydrolysis of the acidic or hydrolyzable functional groups of the monomers according to the nature of the monomers A.

For neutralization/hydrolysis, the polymer obtained in step i. will generally be treated with a base suitable for neutralization or hydrolysis. Typical bases are alkali such as sodium hydroxide or potassium hydroxide, and ammonia.

In general, the base is used in the form of a solution, especially an aqueous solution, for example in the form of concentrated ammonia or in the form of a concentrated aqueous solution of the alkali metal hydroxide, for example in the form of a 20 to 70% by weight solution, especially a 40 to 60% by weight solution.

The amount of base is selected such that an at least partial neutralization/hydrolysis of the neutralizable/hydrolyzable groups in the monomers A polymerized into the polymer is ensured. Preference is given to selecting the amount of base such that, at least in theoretical terms, an at least 25%, particularly at least 50%, especially at least 60% or full neutralization/hydrolysis is ensured, i.e. the amount of base is preferably selected such that the base equivalents account for at least 25 mol %, particularly at least 50 mol % and especially at least 60 mol %, based on the neutralizable/hydrolyzable functional groups in the polymerized monomers A.

The neutralization/hydrolysis may immediately precede, coincide with or follow the addition of the urea and in any case follows the polymerization.

In a preferred embodiment, the neutralization is effected by addition of the base, preferably in the form of a solution, especially of an aqueous solution, to the aqueous polymerization product which may already comprise urea.

The neutralization can be performed with addition of further water or one or more water-miscible organic solvents, for example a $C_1$-$C_4$-alkanol, especially methanol or ethanol.

The neutralization is generally effected with mixing of the constituents, preferably with high shear, to obtain the polymer in the form of particles of a swollen gel.

To obtain the polymer, the neutralized polymer, after the neutralization, will typically be separated from the aqueous liquid and any liquid constituents introduced in the course of neutralization and/or with urea, for example by centrifugation or filtration, and then dried.

The drying can be effected in a manner known per se, for example in suitable driers, for example drying cabinets, paddle driers, belt driers or roll driers. Preference is given to conducting the drying until the content of moisture (water and any solvents) is not more than 20% by weight, particularly not more than 10% by weight, for example down to a residual moisture content of 0.5 to 20% by weight, particularly 1 to 15% by weight and especially 1 to 10% by weight.

The dried polymer can be ground and classified. Grinding can typically be accomplished using one-stage or multistage roll mills, preferably two or three-stage roll mills, pinned disk mills, hammer mills or vibratory mills. Oversize gel lumps which often still have not dried on the inside are elastomeric and can lead to problems in the grinding, and are therefore preferably removed before the grinding, which can be done in a simple manner by wind sifting or by means of a sieve ("guard sieve" for the mill). In view of the mill used, the mesh size of the sieve should be selected such that a minimum level of disruption resulting from oversize, elastomeric particles occurs.

In this way, the polymer is obtained in the form of a pelletized material, especially of a free-flowing pelletized material.

The polymer obtainable in accordance with the invention is formed from the polymerized monomers of the monomer composition M and the substance S used in the polymerization and additionally comprises at least some of the urea present in the course of polymerization or neutralization/hydrolysis. The weight ratio of polymerized monomers M and the substance S corresponds substantially to the amounts used and is therefore generally in the range from 1:9 to 9:1, preferably in the range from 2:8 to 8:2 and especially in the range from 7:3 to 3:7, this ratio the proportion of the polymer originating from the monomers A being calculated on the basis of the acidic or hydrolyzable form used. The polymerized monomers here form a matrix in which the substance S is present in finely divided form.

Without being bound to a theory, it is assumed that under the polymerization conditions there is efficient grafting of the polymer network which forms in the course of polymerization of the monomers to the polysaccharide chains.

In the polymers obtainable in accordance with the invention, the neutralizable or hydrolyzable groups are at least partly in the form of neutralized acid groups, i.e. in the form of anionic groups, for example in the case of carboxylic acid groups or groups hydrolyzable to carboxylic acid groups (for example nitrile groups) as carboxylate groups. The proportion of the neutralized acid groups in the polymer is generally at least 25 mol %, particularly at least 50 mol % and especially at least 60 mol %, based on the total amount of all the neutralizable/hydrolyzable functional groups in the polymerized monomers A.

The polymers obtainable in accordance with the invention feature good water absorption capacity and good water retention capacity. In general, the water absorption capacity is at least 50 g, particularly at least 200 g and especially at least 300 g per g of polymer, calculated as oven-dry material (dry weight). Frequently, the water absorption capacity is in the range from 50 to 800 g per g of polymer (dry weight), particularly 200 to 800 g per g of polymer (dry weight) and especially 300 to 600 g per g of polymer (dry weight). The water absorption capacity reported here is the amount of tap water of hardness dH°=4 that the polymer absorbs at 22° C. The water absorption capacity can be determined in a manner known per se, for example as the centrifuge retention capacity in analogy to the standard test method No. WSP 241.5-02 "Centrifuge retention capacity" as described in: "Standard Test Methods for the Nonwovens Industry", 2005 edition, published jointly by the Worldwide Strategic Partners EDANA (European Disposables and Nonwovens Association, Avenue Eugène Plasky, 157, 1030 Brussels, Belgium, www.edana.org) and INDA (Association of the Nonwoven Fabrics Industry, 1100 Crescent Green, Suite 115, Cary, N.C. 27518, U.S.A., www.inda.org).

With regard to use, the polymer is preferably provided in the form of a free-flowing pelletized material. In such pelletized materials, the mean particle size of the polymer particles is generally at least 200 μm, preferably at least 250 μm and more preferably at least 300 μm, and generally at most 2000 μm, particularly at most 1500 μm and especially at most 1000 μm. The proportion of particles with a particle size of at least 150 μm is generally at least 90% by weight, preferably at least 95% by weight and more preferably at least 98% by weight. The proportion of particles with a particle size of at most 3000 μm is generally at least 90% by weight, preferably at least 95% by weight and more preferably at least 98% by weight. The particle size distribution and mean particle size of the pelletized materials can be determined by the standard test method No. WSP 220.2-05 "Particle size distribution".

Because of their ability to bind and store large amounts of water while at the same time having high compostability, the inventive polymers are suitable for a multitude of applications which likewise form part of the subject matter of the invention.

The inventive polymers can advantageously be used for controlled release of liquids, especially water and aqueous solutions, dispersions and emulsions.

More particularly, the inventive polymers are suitable for improving soil qualities, especially in commercial plant growing. To improve the soil quality, the inventive polymers will typically be incorporated into the soil surfaces in application rates of 1 to 1000 kg/ha, especially in an amount of 1 to 25 kg/h, or in an amount of 0.1 to 100 kg/tonne of soil mass. In this context, the inventive polymers are suitable for improving the quality of plant soil, garden soil, of meadow, lawn and forest soil, or of field soil or field areas. The inventive polymers are especially suitable for retaining and storing moisture in cultivation areas for crop plants. The inventive polymers are additionally particularly suitable for production of crop soils and for recultivation of areas that have become infertile.

The inventive polymers can additionally be used as a soil additive for dust reduction, for example in riding arenas. The inventive polymers can additionally be used as a binder in green surfacing of roadsides, slopes, paths and squares, and roof greening. The inventive polymers can be used in animal stalls for binding of animal excrement and unpleasant odors.

The inventive polymers can additionally be used as a carrier substance for soil structure improvers, as a carrier substance for soil looseners, as a carrier substance for biologically active substances and active ingredients such as crop protection compositions, minerals, fertilizers, especially for the controlled release of these substances.

The invention further provides for the use of the inventive polymers as an extinguishant additive in firefighting.

The invention further provides for the use of the inventive polymers for production of compostable or dissolvable flower or plant pots, and to the use of the use of the inventive polymers as plant substrates.

I. PREPARATION EXAMPLES

Example 1

600 g of soluble lignin-free reject material (woodlike waste material obtained in pulp production for paper), 870 g of acrylic acid, 6 l of demineralized water, 6.45 g of methylenebisacrylamide, 1.5 g of ammonium persulfate were mixed well to give a slurry and introduced into a 10 l bucket. The bucket was placed into a water bath thermostated to 85° C. After about 2 hours, the material had reached a temperature of 78° C. The material was then solid. The polymerization mixture was left to stand for another 1 h while maintaining the bath temperature. The rubberlike, slightly tacky polymerization mixture was easily removable from the bucket in one piece.

Total yield 6.62 kg.

For final neutralization, the rubber cake was first comminuted, then admixed with 18 l of methanol and mixed well. This formed a thick slurry. Then 675 g of a 50% by weight aqueous KOH solution and 728 g of a 50% by weight aqueous urea solution were added together with 3 l of methanol and the whole lot was mixed vigorously for about 15 min. The product coagulated immediately on addition of the urea solution to become a chewing gum-like material, but this broke down very quickly to become a granular product. As soon as the pH was 6 to 7, which was the case after 15 min, the solid obtained was filtered off and dried under reduced pressure at 55° C.

The light brown, free-flowing solid thus obtained exhibited a water absorption capacity at 22° C. of up to 550 g of tap water, dH°=4, per g of solid.

Example 2

30 g of flax dust, 10 g of crude cellulose, 58 g of acrylic acid, 0.43 g of methylenebisacrylamide, 0.1 g of ammonium persulfate, 370 ml of demineralized water and 48 g of a 50% by weight aqueous urea solution and 0.4 g of a commercial wetting agent customary for textile fibers, for example a Triumph wetter (Contripon® S from Zschimmer & Schwarz, 09218 Burgstadt) were mixed vigorously. This slurry mixture was introduced into a 1 l polyethylene bucket. The bucket was placed into a water bath thermostated to 85° C. After about 1 hour, the reaction mixture had already reached the maximum temperature of 71° C. The polymerization mixture was left to stand for another 1 h while maintaining the bath temperature. Subsequently, the rubberlike, slightly tacky polymerization mixture was removed from the bucket in one piece.

Yield 509.1 g.

Then the rubberlike cake was admixed with 1 l of methanol and comminuted with an Ultra-Turrax. This formed a thick brown slurry which, while stirring constantly and vigorously, was admixed with a solution of 250 ml of methanol and 45.1 g of a 50% by weight aqueous KOH solution. In the course of addition, a viscous lump formed immediately, but this very rapidly into a grainy material under vigorous stirring. After 10 min, the treatment was ended. The product obtained was filtered off and dried under the conditions specified for example 1. The water absorption capacity of the product for tap water, dH 4°, was 400 g/g of product at 22° C.

Example 3

160 g of ground cellulose, ARBOCEL BC 1000 from Rettenmeier, 240 g of acrylic acid, 1600 g of demineralized water, 1.72 g of methylenebisacrylamide, 0.4 g of ammonium persulfate were mixed vigorously to give a homogeneous slurry and poured into a medium-sized bucket, and the latter was placed into a water bath at 87° C. After about 2 hours, the reaction mixture had reached the maximum temperature of 91° C. The mixture was left to react at bath temperature 87° C. for another 1 hour, and the material temperature of the contents of the bucket fell back down to 84° C. Subsequently, the rubberlike, slightly tacky product cake was removed from the bucket in one piece.

Yield 1937.2 g.

Then the rubberlike cake was admixed with 3.5 l of methanol and comminuted with an Ultra-Turrax unit. This formed a thick white slurry which, while stirring constantly and vigorously, was admixed with a solution of 1000 ml of methanol, 186.7 g of a 50% by weight aqueous KOH solution and 200 g of a 50% by weight aqueous solution of urea. In the course of addition, a viscous lump formed immediately, but this very rapidly broke down into a grainy material under vigorous stirring. After 10 min, the treatment was ended. The product obtained was filtered off and dried under the conditions specified for example 1. The water absorption capacity of the product for tap water, dH 4°, was 400 g/g of product at 22° C.

II. STUDY OF BIODEGRADABILITY

The following products were tested:
polymer from example 1
polymer from example 4
commercial superabsorbent based on crosslinked polyacrylic acid (Luquasorb 1280 BASF SE)

To study the biodegradability, the carbon mineralization of the polymers was studied in three soils in microcosms over a period of 271 days at 20° C. Straw served as the reference substance. After 271 days, for straw, it was possible to detect 62% of the carbon as $CO_2$ in the middle of the soils, 33% in the case of the polymer from example 1, and 6% for the commercial superabsorbent. Since the rise in carbon mineralization for straw and the polymers, after initially intense mineralization, became linear after 90 days, it was possible to extrapolate the mineralization data. Extrapolated to two years, degradation rates of 92% for straw, 51% for the polymer from example 1 and 17% for the commercial superabsorbent were found. After correcting the mineralization for an annual average temperature of a soil of 10° C., mineralization rates of 20% for the polymer from example 1 and of nearly 7% for the commercial superabsorbent over two years were calculated.

III. STUDY OF SOIL-IMPROVING ACTION

The following products were tested:
polymer from example 2
commercial polymer in the form of a potassium salt of a starch-grafted acrylic acid-acrylamide copolymer (Zeba® Farm from Absorbent Technologies, Inc. Beaverton, Oreg. 97008)
commercial superabsorbent based on crosslinked, partly neutralized polyacrylic acid (Luquasorb® 1280 BASF SE)

The study was conducted outdoors in a cultivation area in central Italy in a sandy soil. The respective products were incorporated into the soil in an application rate of 20 kg/ha. On Jul. 27, 2012, tomato seedlings (150 seedlings/40 m²) were planted into the soils thus treated. One trial plot was watered to an extent of 100%; a further trial plot was watered to an extent of 50%.

During the trial period, i.e. up to harvesting on Oct. 1, 2012, the vigor (plant health) of the plant was assessed visually on the basis of plant height, intensity of green color of the plant, number of leaves and disorders affecting the plant, and rated on a scale from 0 to 10, 0 meaning particularly poor vigor and 10 particularly good vigor. In addition, the amount of tomatoes harvested was determined. The results are given in tables 1 and 2 below.

TABLE 1

Plant vigor

|  | Vigor/100% watering | Vigor/50% watering |
|---|---|---|
| No addition | 5 | 5 |
| Luqasorb ® 1280 | 5.3 | 6.7 |
| Zeba ®Farm | 6.3 | 6.7 |
| Polymer from ex. 2 | 7.0 | 8.3 |

TABLE 2

Yield

|  | Yield/100% watering [kg/ha] | Yield/50% watering [kg/ha] |
|---|---|---|
| No addition | 4035 | 1496 |
| Luqasorb ® 1280 | 6695 | 10059 |
| Zeba ®Farm | 8356 | 7470 |
| Polymer from ex. 2 | 9010 | 11297 |

The invention claimed is:

1. A process for preparing polymers suitable for absorbing and storing aqueous liquids, comprising:
   i. crosslinking free-radical polymerization of a monomer composition M comprising
      a) at least one monomer A selected from monoethylenically unsaturated $C_3$-$C_8$-monocarboxylic acids, mixtures thereof and mixtures of at least one monoethylenically unsaturated $C_3$-$C_8$-monocarboxylic acid with one or more monoethylenically unsaturated $C_4$-$C_8$-dicarboxylic acids,
      b) optionally one or more comonomers B which are different than the monomers A and have one ethylenic double bond, and
      c) 0.05 to 10% by weight, based on the total amount of monomers A and B, of at least one crosslinker C,
      in the presence of at least one finely divided particulate cellulose material S comprising bound lignin, in an aqueous liquid, where the weight ratio of the monomer composition M to the substance S is in the range from 8:2 to 2:8; and
   ii. at least partial neutralization of the acid groups in the polymer obtained in step i.;
   wherein the polymerization and/or the neutralization is performed in the presence of urea and at least 90% by weight of the particles of the particulate cellulose material have dimensions in the range from 1 μm to <500 μm, determined by sieve analysis,
   wherein the amount of urea is from 5 to 60% by weight, based on the total amount of the monomer composition M and substance S, and
   wherein the polymerization is performed at a pH range from 1-4.

2. The process according to claim 1, wherein the polymer obtained in step i. is treated with urea before or during the neutralization in step ii.

3. The process according to claim 1, wherein the total amount of urea is 1 to 20% by weight, based on the total amount of monomer composition M, substance S and aqueous liquid.

4. The process according to claim 1, wherein the cellulose material is selected to an extent of at least 50% by weight, based on the total amount of substance S, from hemp dust, flax dust, sawdust, ground straw, ground olive stones, ground tree bark, reject material from pulp production, sugar beet peel, sugar cane waste, rice husks, cereal husks, and ground hemp fibers, ground flax fibers, ground Chinese silvergrass fibers, ground coconut fibers, ground kenaf fibers and ground wood fibers.

5. The process according to claim 1, wherein at least 90% by weight of the particles of the particulate cellulose material have dimensions in the range from 5 to <300 μm, determined by sieve analysis.

6. The process according to claim 1, wherein the monomers A account for at least 50% by weight, based on the total amount of monomers in the monomer composition.

7. The process according to claim 1, wherein the monomers A comprise at least 50% by weight, based on the total amount of monomers A, of acrylic acid.

8. The process according to claim 1, wherein the crosslinkers C are selected from ethylenically unsaturated monomers having at least 2 ethylenically unsaturated double bonds.

9. The process according to claim 1, wherein the polymerization is performed under oxygen-comprising atmosphere.

10. The process according to claim 1, wherein a viscosity of the reaction mixture, determined to DIN EN 2555-2000 by means of a Brookfield viscometer at 23° C. at a shear rate of <10 $sec^{-1}$, in the range from 10 to 1000 mPa·s is established at the start of the polymerization.

11. The process according to claim 1, wherein the neutralization is followed by separation of the polymer from the aqueous liquid and drying.

* * * * *